United States Patent [19]
Parsons

[11] Patent Number: 5,762,016
[45] Date of Patent: Jun. 9, 1998

[54] DOCK POLE BUMPER ASSEMBLY

[76] Inventor: Tom Parsons, 3504 SE. Narragansett Ter., Stuart, Fla. 34997

[21] Appl. No.: 802,374

[22] Filed: Feb. 19, 1997

[51] Int. Cl.$^6$ .................................................. B63B 59/02
[52] U.S. Cl. ........................................ 114/219; 114/230
[58] Field of Search ............................. 114/219, 220, 114/230; 405/212–215

[56] References Cited

U.S. PATENT DOCUMENTS

| | | | |
|---|---|---|---|
| 2,873,712 | 2/1959 | Gossen | 114/230 |
| 4,066,030 | 1/1978 | Milone | 114/230 |
| 4,067,283 | 1/1978 | Warwick | 114/230 |
| 4,697,538 | 10/1987 | Day | 114/230 |
| 5,138,965 | 8/1992 | Culp | 114/230 |
| 5,150,744 | 9/1992 | Hayashi et al. | 114/230 |
| 5,184,562 | 2/1993 | Hallin | 114/219 |
| 5,301,628 | 4/1994 | Daskalides | 114/230 |

FOREIGN PATENT DOCUMENTS 2270664  3/1994  United Kingdom ............... 114/230

*Primary Examiner*—Jesus D. Sotelo
*Attorney, Agent, or Firm*—Keaty & Keaty

[57] ABSTRACT

The invention relates to a dock pole bumper assembly for securing a boat to mooring piling. The assembly has a stationary portion which is secured to the piling and forms a track along which the movable portion glides. A movable portion has a rigid part and a flexible deformable part. The rigid part is provided with a guide channel for engaging the stationary portion during use of the bumper assembly. The resilient deformable portion has an impact-receiving contact surface and non-contacting opposing side walls. Mooring cleats are mounted on the side walls of the rigid member to allow a mooring line of a boat to be secured thereto. An insert of a friction-resistant material is fitted in the guide channel to facilitate movement of the movable portion along the stationary track.

18 Claims, 4 Drawing Sheets

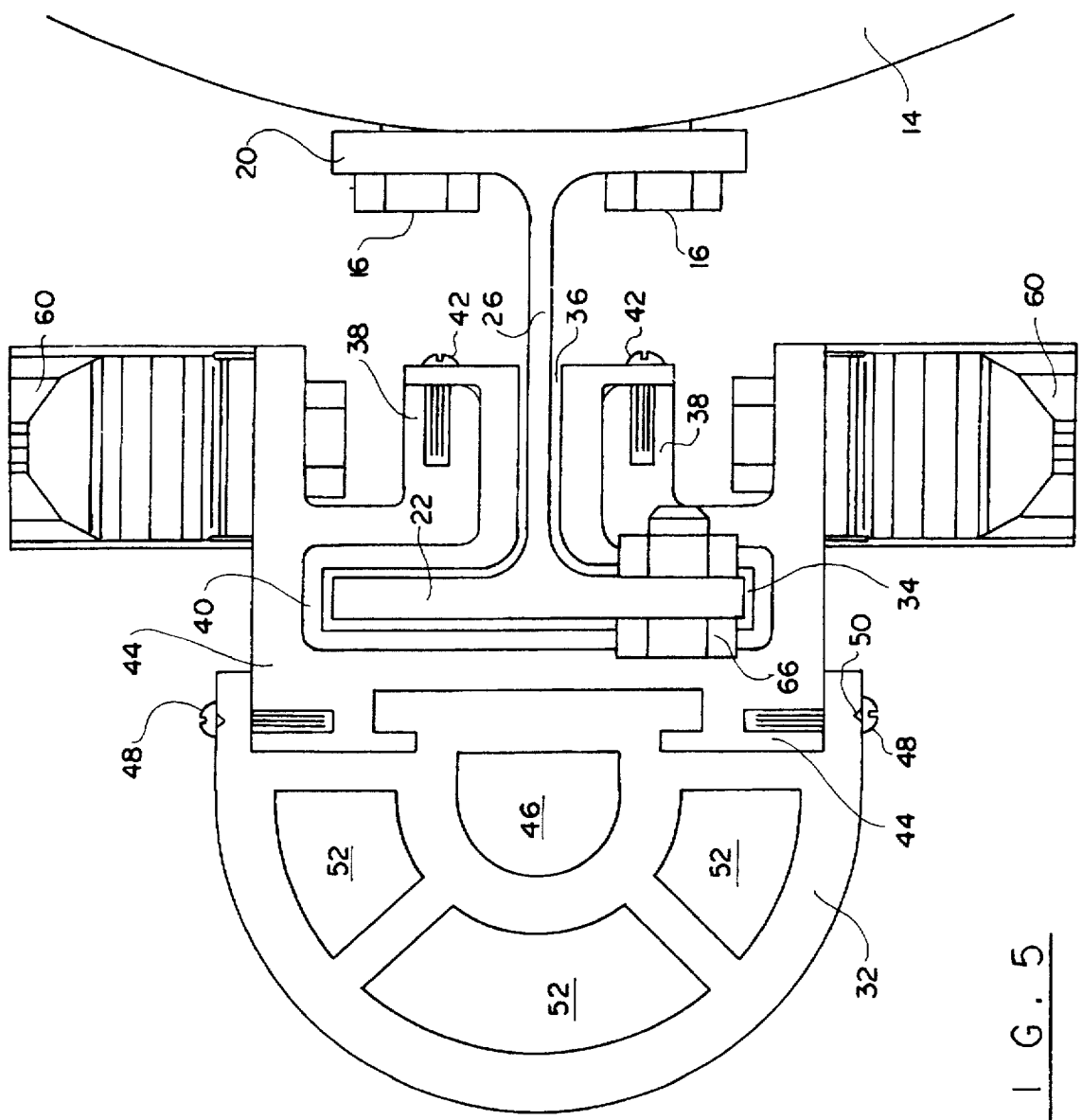

DOCK POLE BUMPER ASSEMBLY

BACKGROUND OF THE INVENTION

The present invention relates to a boat docking assembly, and more particularly to a dock pole adapted to protect the hull of a boat tied to a mooring piling.

Conventionally, docks or other mooring devices are positioned along the docks to allows individual boat owners to tie a boat in a secure manner for a discrete period of time. The secured boats are subject to tide and wave motions, causing the boats to move up and down, to pitch and roll depending on the shape of the wave, as well as inertia or surge of the wave. When a boat is moored to the dock with ropes, wave movement pushes the boat laterally towards the dock which causes friction with the dock poles, or mooring pilings. The boats come into a contact with the piles, such that rails and sides of the boats become damaged, especially boats made from plastic material.

To solve the problem, several devices that have been used by boaters in an effort to protect the boat hull when it comes in contact with the dock, or a pole. Some boat owners use bumpers that are tied to the boat and extend over the side of the boat to a critical location where the contact is most likely. Other boat owners prefer to use vehicle tires secured to a dock post in order to form a bumper on the dock itself.

However, these devices suffer from disadvantages because the shape and height of the wave is difficult to predict, as a result of which the boat tends to rub against the exposed portion of the post or to come in contact with an unprotected post with the portion of the hull that does not have a protective bumper.

The present invention contemplates elimination of drawbacks associated with the prior art and provision of a dock pole bumper assembly for use with a dock pole, or mooring pile for protection of a boat hull against damage through contact with the dock.

SUMMARY OF THE INVENTION

It is, therefore, an object of the present invention to provide a dock pole assembly with a bumper which allows for securing of a boat to the dock pole, while protecting the hull of the boat.

It is another object of the present invention to provide a slidable dock pole bumper assembly which moves in coordination with the wave and tide motion, thereby continuously protecting the boat against damage.

It is another object of the present invention to provide a dock pole bumper assembly which is easy to install and inexpensive to manufacture.

These and other objects of the present invention are achieved through a provision of a dock pole bumper assembly suitable for securing to a dock pole, or a mooring piling. The bumper assembly comprises a stationary portion, which is adapted for secure attachment to the dock pole and which has a discrete length sufficient to extend above the water surface and below the water surface.

The bumper assembly further comprises a movable portion which is slidably engaged with the stationary portion, the movable portion having a resilient, deformable bumper for contacting the hull of a boat without damaging the hull when the boat is moored to the dock pole. One or more cleat members are secured to non-contact surface of the movable portion to prevent damage to the boat hull. Mooring lines of the boat are secured to the cleat member(s) with a zero slack in the mooring line.

The stationary portion can be formed in the shape of an I-beam track member, with one transverse flange being adapted for attachment to the mooring piling, while the second transverse flange is adapted to serve as a track member along which the movable portion moves. The movable portion has a rigid member formed with a guide channel for receiving at least the second flange of the track member and for preventing lateral movement of the movable portion during use.

An insert is fitted in the guide channel, the insert being made of friction-resistant material, such as Teflon®, or similar type to facilitate movement of the movable portion along the track member. In the alternative an exterior surface of the insert is formed from a friction-resistant material. A deformable member of the movable portion can be detached, if worn or damaged, thereby saving an expense of replacing the entire bumper assembly when only the impact receiving part needs to be replaced.

BRIEF DESCRIPTION OF THE DRAWINGS

Reference will now be made to the drawings, wherein like parts are designated by like numerals, and wherein

FIG. 5 is a top detail view of the dock pole bumper assembly of the present invention.

DETAIL DESCRIPTION OF THE PREFERRED EMBODIMENT

Figure 1:
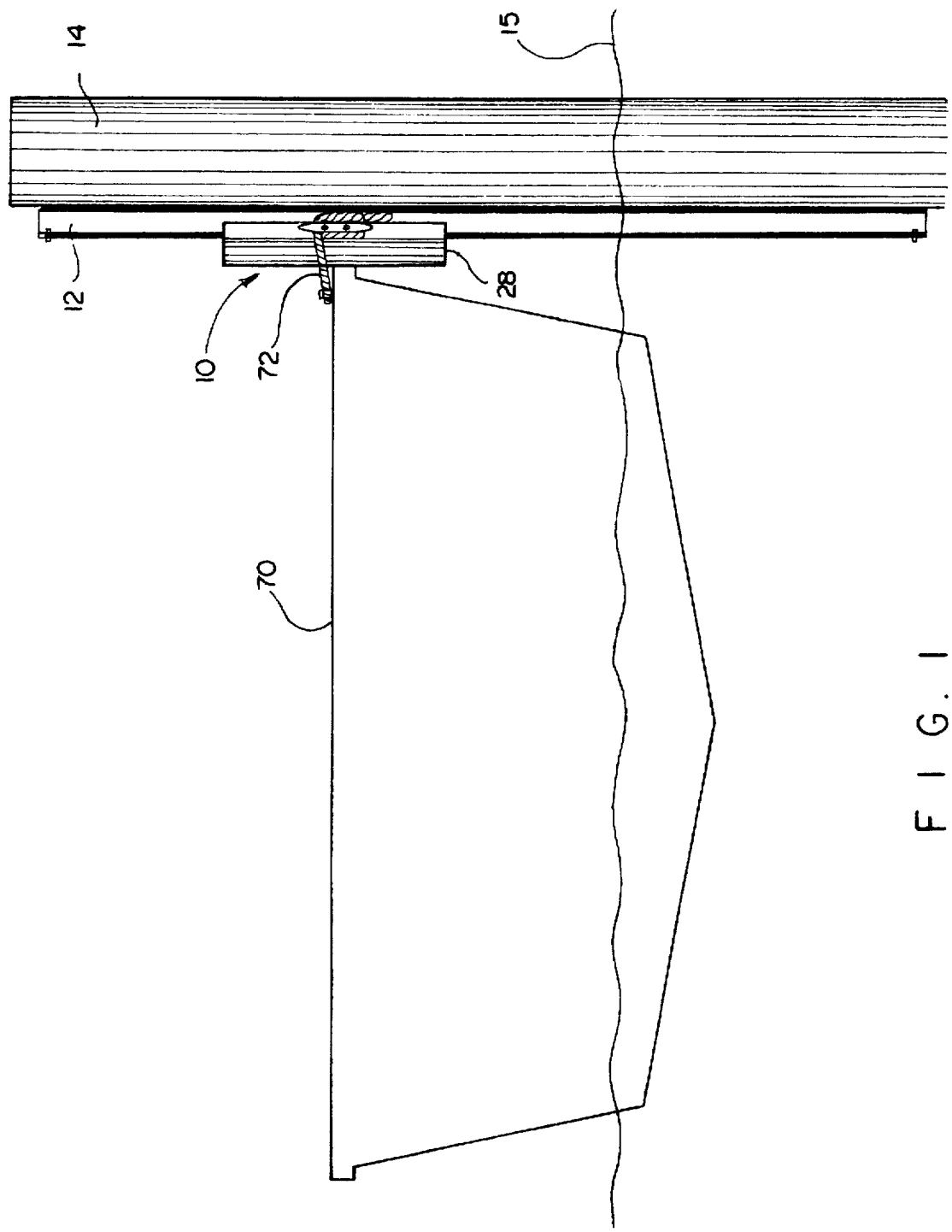
FIG. 1 is a perspective view of a dock pole bumper assembly in accordance with the present invention mounted on a mooring piling, with a boat tied to the pole schematically illustrated.
Figure 2:
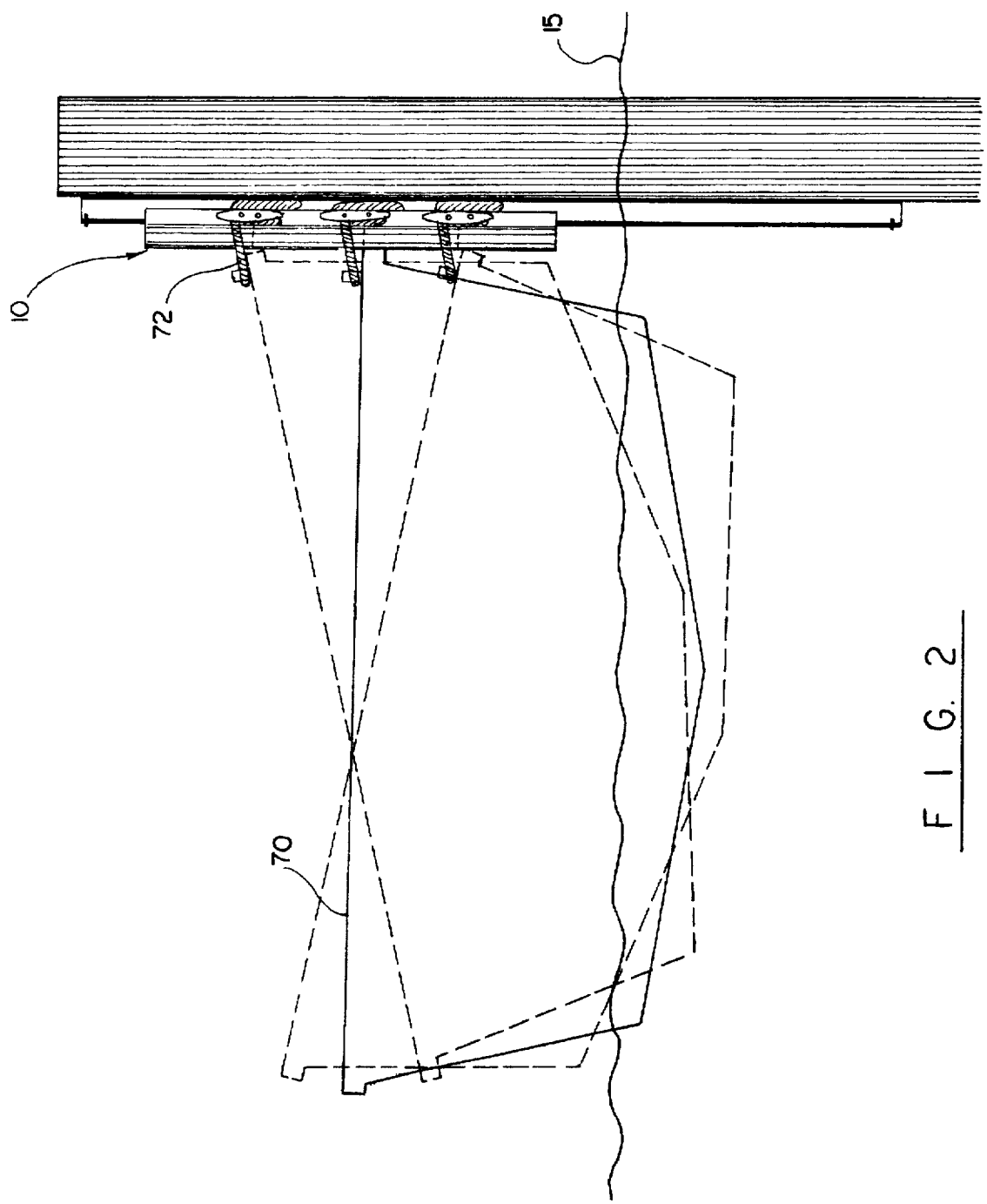
FIG. 2 is a side view of the dock pole bumper assembly of the present invention mounted on a dock pole, with the boat shown in different positions according to wave motion.

Referring now to the drawings in more detail, FIG. 1 illustrates a dock pole bumper assembly in accordance with the present invention. The bumper assembly is designated by numeral 10 in the drawings and is shown to comprise a stationary portion 12 and a movable, or sliding portion. The stationary portion is comprised of an I-beam shaped track member fixedly secured to a mooring pile, or dock pole 14 by a plurality of bolts 16. Other suitable means for attaching the track member 12 to pole 14 can be employed, if desired.

Figure 4:
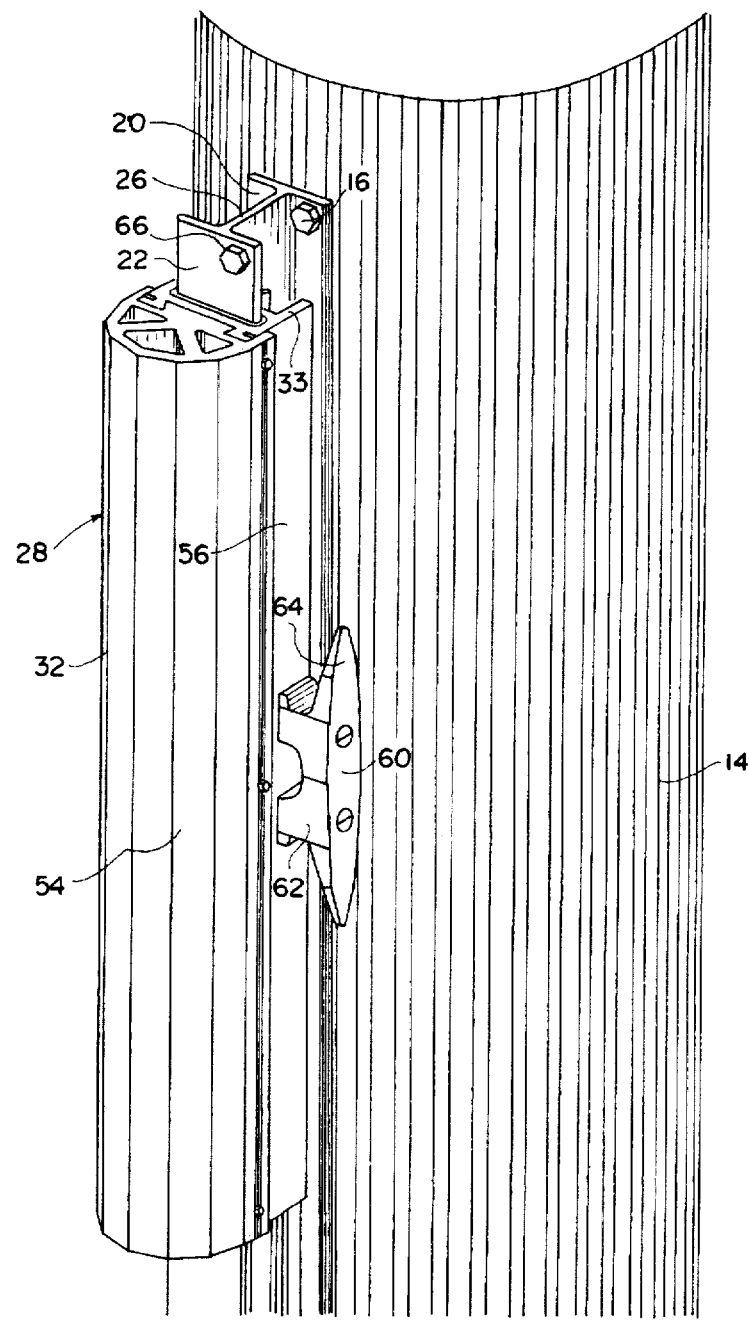
FIG. 4 is a detail perspective view showing the sliding portion of the dock pole bumper assembly of the present invention mounted on a stationary track member.

It is important that the track member 12 remain stationary in relation to the mooring piling 14 after it has been secured to the pole. It is preferred that the track member extend along substantially entire length of the piling 14, extending above the water surface 15 and below the water surface. As can be seen in FIG. 4, the width of a first transverse flange 20 is substantially smaller than the width of the mooring piling 14, although different sizes and shapes of the transverse portion 20 can be employed.

A second transverse flange 22 of the I-beam shaped track member 12 extends a distance from the exterior surface of the piling 14, the distance being dictated by the size of the connecting member 26.

A sliding portion 28 is adapted for sliding movement along substantially entire length of the track member 12, with the sliding distance being limited only by a stop means, as will be described in more detail hereinafter.

Turning now in detail to FIGS. 4 and 5, the sliding portion of the assembly 10 is shown to comprise a rigid track engaging member 30 and a flexible, resilient, deformable bumper member 32. The track engaging member 30 has an irregularly shaped cross-section (see FIG. 5) suitable to enclose at least the second transverse flange 22 of the I-beam 12.

A through opening, or guide channel 34 is formed in the member 30, the opening 34 being sized and shaped to receive the flange 22 therein. The guide channel 34 communicates with an extension of the open channel 36 extending to the rear of the member 30 in a somewhat enclosing relationship to at least a portion of the connecting member 26 of the track 12.

An insert 40 is fitted into the guide channels 34, 36 extending along substantially entire openings through the length of the movable, sliding portion 28. The insert 40 is made of a friction-resistant material such as Teflon®, or other similar material. The friction-resistant material facilitates easy slidable movement of the sliding portion 28 along the stationary track member 12. In the alternative, the insert can be coated with a friction-resistant material, such that the exterior surface of the insert 40 is smooth and non-corrosive.

The insert 40 is secured to extensions 38 of the rigid part 30 by suitable means, such as bolts, or self-tapping TEKS® screws 42, more clearly shown in FIG. 5. Since the size of the opening 34 in the channel 36 is at least slightly greater than the size of the transverse portion 24 and the longitudinal portion 26, respectively, the sliding portion 28 is allowed to freely move, in a vertical direction, along the track 12, with a minimum lateral movement that is restricted by the second transverse flange 22.

The resilient bumper member 32 is securely, detachably carried by an outer extension 44 of the rigid member 30. A generally rectangular opening 46 is formed in the extension 44 in order to accommodate a similarly shaped rear portion of the resilient member 32. The opening 46 extends vertically, through the entire length of the extension 44.

In order to insure a secure position of the resilient member 32 on the member 30, a plurality of securing members, such as bolts, or TEKS® screws 48 are fitted in a groove 50 formed in the side walls of the resilient member 32, as can be better seen in FIG. 4.

The groove, or channel 50, extends along the entire length of the resilient member 32 at a lateral position suitable for engagement with the outer extensions 44 of the rigid member 30. Of course, other means of securing the resilient bumper member 32 can be employed, if desired, allowing the user to easily detach the member 32 when it becomes worn or damaged. In such a case, it is not necessary to dismantle the entire bumper assembly 10, but rather to disengage bolts 48 and remove the resilient member 32, replacing the member 32 with a new resilient member. As a result, time and money can be saved when the bumper assembly 10 of the present invention is used.

In order to reduce the weight of the resilient member 32, as well as make it readily deformable on impact, the member 32 is provided with one or more through openings 52 spaced within the body of the member 32 in any desired fashion. An exterior surface 54 of the resilient member 32 can be shaped in any desired manner. It can be semi-circular, arcuate, concave, polygonal and the like. It is preferred that the member 32 extend along the front of the bumper assembly 12, as well as somewhat along the sides of the extensions 44, to allow securing of the resilient member 32 to the rigid member 30 without having the bolts 48 coming into contact with the boat hull.

A pair of cleats 60 are fixedly detachably secured to the side walls 56 of the rigid member 30. The cleats 60 can be conventional cleats traditionally used in the mooring of a boat to a dock, or any other suitable means for tying a boat to the assembly 10. The cleats 60, better seen in FIG. 4, have a reduced width portion 62 about which a rope is conventionally wrapped and tied to prevent disengagement of the rope. An outwardly extending plate 64 is formed of a significantly greater longitudinal dimensions than the middle portion 62. The cleat members 60 are attached to a non-contacting side walls of the sliding portion 28 to prevent any damage to a boat hull due to a possible contact with the boat.

Figure 3:
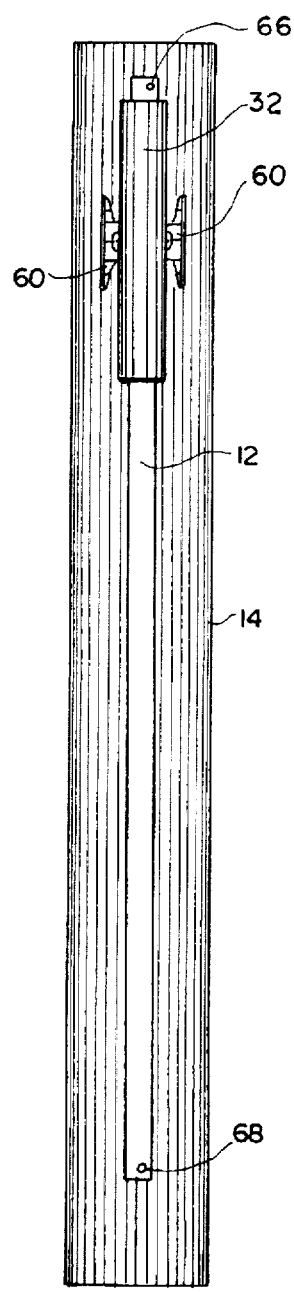
FIG. 3 is a front view of the dock pole bumper assembly in accordance with the present invention mounted on the dock pole.

To limit the sliding movement of the portion 28 along the stationary portion 12 and prevent disengagement of the sliding portion 28, the device 10 is provided with limiting stops 66, 68 secured to the second flange 22, near a top and bottom thereof, respectively. The limiting stops 66, 68 can be bolts or screws detachably secured to the second flange 22, as can be seen in FIGS. 3–5.

In operation, a boater docks the boat in a desired location along the dock and ties the boat to the bumper assembly 10 by wrapping a mooring about the cleats 60. It is preferred that the boat is tied to the assembly 10 with a minimum slack, to prevent lateral motion of the boat due to wave and tide forces.

The boat comes into repeated contacts with the resilient member 32 during the time when it is moored, deforming, compressing the resilient bumper member 32 during lateral movement. At the same time, the sliding portion 28 moves up and down, with the wave and tide forces, along the stationary track member 12, allowing the boat to move in a vertical direction without coming into contact with the piling 14.

It is preferred that the resilient bumper member 32 be at least as long as the widest portion of a boat hull, as it was observed that the bottom of the boat rarely comes into contact with a dock pile. The mooring bumper assembly 10 will thereby protect the rail and the upper part of the hull at all times. Of course, it is within the scope of the present invention that the bumper assembly be made long enough to have the resilient member 32 extend to the same length as the height of the boat, if desired.

The preferred embodiment of the present invention utilizes a rigid track member formed from a corrosion-resistant material, such as aluminum or stainless steel. Similarly, the rigid member 30 and the cleats 60 can be formed from a corrosion resistant material suitable for the type of environment where the assembly 10 is to be located.

The resilient bumper member 32 can be made from high impact plastic, rubber, or other suitable material which would deflect upon contact with a boat hull without damaging the hull. It is within the scope of those skilled in the art that the resilient member 32 be formed by extrusion, molding, or by similar methods.

Many changes and modifications can be made in the design of the present invention without departing from the spirit thereof. I, therefore, pray that my rights to the present invention be limited only by the scope of the appended claims.

I claim:

1. A dock pole bumper assembly for securing a boat to a dock pole, comprising:

a stationary portion adapted for secure attachment to a dock pole;

a movable portion slidably engaged and movable along the stationary portion, said movable portion having an outer surface fitted with a resilient deformable bumper member, said bumper member having a contact surface for contacting a hull of a boat moored to the dock pole, and a means carried by a non-contacting surface of the movable portion for securing a mooring line of a boat to the movable portion.

2. The assembly of claim 1, wherein said stationary portion comprises an I-beam shaped track member having a discrete length for extending along said dock pole above a water surface and below a water surface.

3. The assembly of claim 2, wherein said track member has a first transverse flange adapted to be securely attached to a dock pole, and a second transverse flange forming a track along which the movable portion travels in response to a wave motion.

4. The assembly of claim 3, wherein said movable portion comprises a rigid member provided with a guide channel for receiving at least said second flange therein.

5. The assembly of claim 3, wherein said resilient bumper member is detachably fitted onto said rigid member.

6. The assembly of claims 1, wherein said movable portion is formed with a guide channel for receiving at least a part of said stationary portion therein.

7. The assembly of claim 1, further comprising means for limiting movement of said movable portion along said stationary portion.

8. The assembly of claim 7, wherein said movement limiting means are mounted adjacent a top part of said stationary portion and adjacent a lower part of said stationary portion.

9. A dock pole bumper assembly for securing a boat to a dock pole, comprising:

a stationary portion adapted for secure attachment to a dock pole, said stationary portion comprising an I-beam shaped track member having a discrete length for extending along said dock pole above a water surface and below a water surface;

a movable portion slidably engaged and movable along the stationary portion, said movable portion carrying a resilient deformable bumper member having a contact surface for contacting a hull of a boat moored to the dock pole, and means carried by a non-contacting surface of the movable portion for securing a mooring line of a boat to the movable portion, said track member having a first transverse flange adapted to be securely attached to a dock pole, and a second transverse flange forming a track along which the movable portion travels in response to a wave motion;

wherein said movable portion comprises a rigid member provided with a guide channel for receiving at least said second flange therein, and wherein an insert is fitted in said guide channel, said insert having a friction-resistant exterior surface to facilitate sliding movement of the movable portion along said transverse second flange.

10. A dock pole bumper assembly for securing a boat to a dock pole, comprising:

a stationary portion adapted for secure attachment to a dock pole;

a movable portion slidably engaged and movable along the stationary portion, said movable portion carrying a resilient deformable bumper member having a contact surface for contacting a hull of a boat moored to the dock pole and means carried by a non-contacting surface of the movable portion for securing a mooring line of a boat to the movable portion, said movable portion being formed with a guide channel for receiving at least a part of said stationary portion therein and wherein an insert is fitted in said guide channel, said insert having a friction-resistant exterior surface to facilitate sliding of the movable portion along said stationary portion.

11. A dock pole bumper assembly for securing a boat to a dock pole, comprising:

a stationary portion adapted for secure attachment to a dock pole;

a movable portion slidably engaged and movable along the stationary portion, said movable portion having a resilient deformable bumper member having a contact surface for contacting a hull of a boat moored to the dock pole and means carried by a non-contacting surface of the movable portion for securing a mooring line of a boat to the movable portion, and wherein said means for securing a mooring line of a boat to said movable portion comprises at least one cleat member secured to a side wall of said movable portion.

12. A dock pole bumper assembly for securing a boat to a dock pole, comprising:

a stationary portion comprising a track member adapted for secure attachment to a dock pole, said stationary portion having a discrete length for extending along said dock pole above a water surface and below a water surface, said stationary portion having a first transverse flange adapted for secure attachment to a dock pole and a second transverse flange extending in a substantially parallel relationship to the first transverse flange;

a movable portion adapted for sliding movement along the stationary portion, said movable portion being provided with a guide channel for receiving the second transverse flange therein, said movable portion having an outer surface fitted with a resilient deformable bumper member, said bumper member having a contact surface for contacting a hull of a boat moored to the dock pole.

13. The device of claim 12, wherein said movable portion is provided with a means for securing the mooring line of a boat to a non-contacting surface of the movable portion.

14. The assembly of claim 12, further comprising means for limiting sliding movement of said movable portion along said stationary portion and preventing disengagement of said movable portion from said sliding portion.

15. The assembly of claim 14, wherein said movement limiting means comprises a pair of stops detachably secured to said stationary portion.

16. A dock pole bumper assembly for securing a boat to a dock pole, comprising:

a stationary portion comprising a track member adapted for secure attachment to a dock pole, said stationary portion having a discrete length for extending along said dock pole above a water surface and below a water surface, said stationary portion having a first transverse flange adapted for secure attachment to a dock pole and a second transverse flange extending in a substantially parallel relationship to the first transverse flange;

a movable portion adapted for sliding movement along the stationary portion, said movable portion being provided with a guide channel for receiving the second transverse flange therein, said movable portion carrying a resilient deformable bumper member having a contact surface for contacting a hull of a boat moored to the dock pole, and wherein said movable portion comprises a rigid member provided with an insert fitted within said guide channel, said insert having a friction-resistant exterior surface to facilitate sliding movement of the movable portion along said second transverse flange of the track member.

17. The assembly of claim 16, wherein the resilient bumper member is detachably fitted onto said rigid member.

18. A dock pole bumper assembly for securing a boat to a dock pole, comprising:

A stationary portion comprising a track member adapted for secure attachment to a dock pole, said stationary portion having a discrete length for extending along said dock pole above a water surface and below a water surface, said stationary portion having a first transverse flange adapted for secure attachment to a dock pole and a second transverse flange extending in a substantially parallel relationship to the first transverse flange;

a movable portion adapted for sliding movement along the stationary portion, said movable portion being provided with a guide channel for receiving the second transverse flange therein, said movable portion carrying a resilient deformable bumper member having a contact surface for contacting a hull of a boat moored to the dock pole, and wherein said means for securing a mooring line of a boat to the movable portion comprises a pair of cleat members secured on opposite side walls of said movable portion.

* * * * *